(12) United States Patent
Huot et al.

(10) Patent No.: US 7,837,124 B2
(45) Date of Patent: Nov. 23, 2010

(54) FOLDABLE DATA SUPPORT WITH A CONTACTLESS CHIP SUCH AS A PASSPORT

(75) Inventors: Jean-Claude Huot, Rouen (FR); Yves Eray, Ouistreham (FR)

(73) Assignee: Oberthur Technologies, Levallois-Perret (FR)

( * ) Notice: Subject to any disclaimer, the term of this patent is extended or adjusted under 35 U.S.C. 154(b) by 579 days.

(21) Appl. No.: 11/994,498

(22) PCT Filed: Jul. 4, 2006

(86) PCT No.: PCT/FR2006/001577

§ 371 (c)(1),
(2), (4) Date: Jan. 3, 2008

(87) PCT Pub. No.: WO2007/006900

PCT Pub. Date: Jan. 18, 2007

(65) Prior Publication Data

US 2008/0210763 A1   Sep. 4, 2008

(30) Foreign Application Priority Data

Jul. 6, 2005   (FR) .................................. 05 07205

(51) Int. Cl.
*G06K 5/00* (2006.01)
*G06K 19/06* (2006.01)
*G06K 19/00* (2006.01)
*G06Q 10/00* (2006.01)
*G08B 13/14* (2006.01)
*G08B 21/00* (2006.01)

(52) U.S. Cl. ........................ 235/492; 235/380; 235/487; 705/5; 340/572.1; 340/638

(58) Field of Classification Search ................. 235/380, 235/487, 492; 340/572.1, 638; 705/5
See application file for complete search history.

(56) References Cited

U.S. PATENT DOCUMENTS 5,710,421 A * 1/1998 Kokubu ...................... 235/492
6,108,636 A * 8/2000 Yap et al. ....................... 705/5
6,375,780 B1   4/2002 Tuttle et al.

(Continued)

FOREIGN PATENT DOCUMENTS

DE            197 21 057 A1     11/1998

(Continued)

*Primary Examiner*—Thien M. Le
*Assistant Examiner*—Thien T Mai
(74) *Attorney, Agent, or Firm*—Young & Thompson

(57) ABSTRACT

The invention relates to a flexible data support, comprising a support with at least first and second sheets (11, 12A, 12B, 12C) which can pivot relative to each other about an axis (P) along the edges of said sheets and a contactless chip housed in said support and comprising an electronic circuit (IC) and coupling elements (A1, A2) connected to said electronic circuit distributed about the first and second sheets which may be electromagnetically coupled to an external reading station. The electronic circuit comprises an information exchange section for exchange of information with the exterior, characterised in that said support is provided with a test device for verification by means of signals emitted by the coupling elements of a geometrical condition of the angular configuration of the first and second sheets and to generate, as function of the result of said test, a signal authorizing or preventing the activation of the exchange section of the electronic circuit.

16 Claims, 6 Drawing Sheets

U.S. PATENT DOCUMENTS

| | | | |
|---|---|---|---|
| 6,719,205 B1 * | 4/2004 | Püschner et al. | 235/492 |
| 7,755,501 B2 * | 7/2010 | Silvennoinen | 340/638 |
| 7,768,400 B2 * | 8/2010 | Lawrence et al. | 340/572.1 |
| 2003/0168514 A1 | 9/2003 | Rancien et al. | |
| 2007/0138297 A1 * | 6/2007 | Sickert et al. | 235/492 |
| 2008/0223925 A1 * | 9/2008 | Saito et al. | 235/380 |

FOREIGN PATENT DOCUMENTS

| | | |
|---|---|---|
| WO | 03/100721 A1 | 12/2003 |
| WO | 2005/045754 A1 | 5/2005 |

* cited by examiner

US 7,837,124 B2

FOLDABLE DATA SUPPORT WITH A CONTACTLESS CHIP SUCH AS A PASSPORT

BACKGROUND OF THE INVENTION

The invention concerns a foldable data support with a contactless chip. It therefore concerns a foldable electronic entity including a contactless chip integrated into a foldable support, such as a passport, a driver's license or any other identity document that a bearer may be required to show during identity checks; it also concerns foldable chip cards for banking applications in particular.

In fact, integrating into a security document, in practice carrying printed data intended to enable an identity check, a contactless chip, i.e. a microprocessor integrated circuit intended to communicate with the external environment by means of an antenna, to enable contactless exchange of information between the document and an external checking station, has already been proposed. This can enable the exchange of data more rich in information than printed characters or even a photograph, such as biometric data, and where appropriate enable verification of the compatibility of the printed data and the stored data so as to detect any attempt to corrupt the printed data.

However, this principle of contactless reading of the data contained in the integrated circuit comes up against the understandable misgiving that this data could be read without the bearer's knowledge by systems that might not be authorized.

Solutions have been proposed for preventing any such unauthorized reading, for example in the document WO2005/045754, by identifying two reference positions of the document, for example the "open" and "closed" positions, and providing for reading of the data to be possible only in one or the other of those positions, or between these two positions. To this end, the integrated circuit is connected to at least one element for coupling it to the external environment, which element is able or unable, depending on the configuration of the security document, to exchange information with the external environment. Thus the document cited above describes a solution in which the coupling element is an antenna produced on two sheets: depending on the geometry of the antenna and on the instantaneous configuration of the document, the integrated circuit detects an electromagnetic field or fails to detect it. In a first embodiment, if the antenna has turns each of which is produced in part on each of said sheets, that antenna enables exchange when the document is open (the turns have a maximum exchange area), whereas, when the document is closed, the halves of each turn are superposed so that they conjointly define a null area, preventing any exchange with the external environment. A converse situation is obtained if the antenna is produced in the shape of an 8, with the antenna tracks crossing over in line with the fold line between the sheets: in this configuration, exchange is possible only when the document is closed. The document cited above further describes solutions involving capacitive type coupling elements.

A similar solution is described in the document DE-19721057, in the case of foldable chip cards.

Clearly such solutions offer only moderate protection against unauthorized reading, given that it remains possible to exchange information with the foldable data support by sufficiently increasing the electromagnetic power radiated in the vicinity of the data support.

SUMMARY OF THE INVENTION

An object of the invention is to improve the security of exchanges by subordinating any functioning of the exchange process of the integrated circuit to verification of a test on the instantaneous geometrical configuration of the data support concerned, independently of the power radiated in its environment.

To this end the invention proposes a foldable data support including a support with at least first and second sheets adapted to pivot relative to each other about a line along the edges of said sheets and a contactless chip mounted in said support and including an electronic circuit and coupling elements connected to said electronic circuit distributed between the first and second sheets and adapted to be electromagnetically coupled to an external reading station, this electronic circuit including an exchange portion adapted to exchange information with the external environment, characterized in that said support carries a test device adapted to verify by means of signals emitted by the coupling elements a geometrical condition on the angular configuration on the first and second sheets and to generate as a function of the result of said test a signal authorizing or prohibiting activation of the exchange portion of the electronic circuit.

Thus according to the invention a test is applied to the signal(s) emitted by the coupling elements to verify electronically (which encompasses the intervention of software circuits) the production of a geometrical condition between two sheets of the data support concerned. This differs fundamentally from the known solutions, which merely provide for the electronic circuit not to receive any signal if the data support is not in the required geometrical configuration. The invention therefore makes initiating exchanges with the external environment more secure.

It should be made clear here that the concept of sheets here includes flexible sheets, such as those of a passport, and rigid sheets, such as those of a folding chip card.

According to preferred features of the invention, which may be combined where applicable:

- the geometrical condition on the angular configuration of the first and second sheets entails comparison of the instantaneous angular offset between the first and second sheets to at least one threshold value; alternatively, this geometrical condition entails detection of a significant variation of that angular offset; the geometrical condition preferably entail both comparison of the angular offset to a threshold and comparison of a variation of that offset to another threshold,
- the coupling elements include first and second antennas connected in parallel to inputs of the test stage and carried by the first and second sheets, respectively, which enables comparison of the instantaneous signals (emitted by the two antennas); alternatively, these coupling elements can be formed of a single antenna that is folded on itself in the folded configuration of the data support, so as not to generate any significant signal,
- the test device is designed to detect the voltage between the terminals of each of the first and second antennas and to authorize activation of the exchange portion if the difference between the voltages between the terminals of the antennas reaches a predetermined threshold corresponding to a predetermined angular threshold; this is a reliable solution that is easy to implement,
- alternatively, the test device is designed to detect the phase of each signal emitted by the first and second antennas and to authorize activation of the exchange portion of the electronic circuit if the difference between the phases of those signals reaches a predetermined threshold corresponding to a predetermined angular threshold;

in a variant combining the preceding two variants the test device is designed to detect the voltage between the terminals of each of the first and second antennas, to detect the phase of each of the signals emitted by those antennas and to authorize activation of the exchange portion of the electronic circuit if the difference between the voltages between the terminals of the antennas reaches a first predetermined threshold and if the difference between the phases of those signals reaches a second predetermined threshold, these first and second predetermined thresholds corresponding to a predetermined angular threshold; this has the advantage of combining two tests, which offers better security thanks to a good knowledge of the instantaneous geometry of the document, the test device is designed to determine the difference between the voltages between the terminals of the first and second antennas by subtraction of the signals emitted by those antennas, the test device is designed to determine the difference between the phases of the signals emitted by the antennas by multiplication of those signals, in the latter case, the test device advantageously includes a low-frequency filter device after a multiplication stage, the antennas have the same geometry to generate identical signals when the two sheets are superposed; this greatly facilitates the comparison of the signals emitted by them, the antennas are situated on the respective sheets so as to be superposed when the sheets that carry them are superposed; this also greatly facilitates the comparison of the signals emitted by them; these two conditions can be combined, the sheets form part of a passport, which corresponds to one advantageous application of the invention.

It goes without saying that the test device (or even the low-frequency filter device) can be an electronic circuit as such but that it is preferably software that can be integrated into the integrated circuit.

The invention further proposes a method of controlling exchange of information between a foldable data support and an external reading station, the foldable data support including a support having at least first and second sheets adapted to pivot relative to each other about a line along the edges of these sheets, and a contactless chip mounted in this support and including an electronic circuit and coupling elements connected to this electronic circuit, distributed between the first and second sheets and adapted to be electromagnetically coupled to the external reading station, this electronic circuit including a portion adapted to exchange information with the external environment, characterized in that a test is carried out to verify, by means of signals emitted by the coupling elements, a geometrical condition on the angular configuration of the first and second sheets, and there is generated, as a function of the result of that test, a signal authorizing or prohibiting activation of the portion of the electronic circuit adapted to exchange information with the external environment.

BRIEF DESCRIPTION OF THE DRAWINGS

Objects, features and advantages of the invention emerge from the following description, given by way of illustrative and nonlimiting example with reference to the drawings, in which.

DETAILED DESCRIPTION OF THE INVENTION

There is considered hereinafter a foldable data support consisting of a document, such as a passport.

Figure 1:
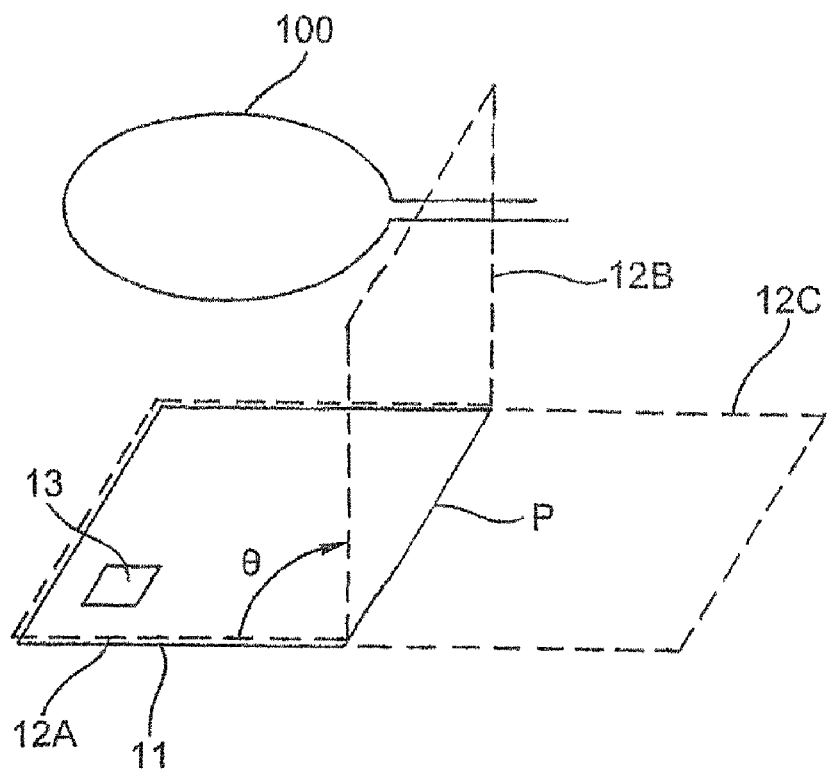
FIG. 1 is a diagrammatic view of a foldable data support with two sheets facing a read antenna of a read station.

For further explanation, it is assumed that the document is, in its closed configuration, in a configuration parallel to an antenna of a read station. Thus in FIG. 1 the document 10 includes a first sheet 11 (shown in solid line) and a second sheet 12 (shown in dashed line) adapted to pivot relative to the first about a line running along the edges of these sheets. To be more precise, this second sheet is here connected to the first sheet by a fold edge P. To be more precise, this second sheet 12 is designated by the reference 12A when it is disposed on the first sheet, by the reference 12B when it has pivoted 90° relative to that sheet, and by the reference 12C when it has pivoted 180° relative to that sheet 11, being substantially aligned with it.

An antenna (not shown) is produced in each of these sheets, preferably much smaller in area than the antenna 100 of the read station.

If it is further assumed that these two antennas are the same size and rigorously superposed in the closed configuration of the document and that they are connected in parallel to the integrated circuit of the document (shown diagrammatically under the reference in FIG. 1), it is clear that the coupling is at a maximum between each of the antennas contained in the sheets 11 and 12A and the antenna 100 and that the voltages at the terminals of these two antennas are substantially equal.

In fact this coupling can be measured by the amplitude of the current that flows in the antenna concerned.

Opening the document entails pivoting the second sheet vis á vis the first sheet. Considering the configuration of the second sheet indicated by the reference 12B, it is seen that the two sheets are substantially perpendicular to each other; since the first sheet has remained parallel to the antenna 100 of the read station, the coupling between the antenna contained in this first sheet and that antenna 100 is at a maximum, whereas there is approximately no coupling between the antenna contained in the sheet 12B and the antenna 100. To a first approximately, the voltage between the terminals of the antenna integrated into the first sheet is equal to that which existed when the sheet 12 was in line with the first sheet; on the other hand, the voltage at the terminals of the antenna integrated into the second sheet is at a minimum. By way of simplification, it may be stated that this voltage U2 is a null voltage. Again approximating, it can be stated that, if θ is the angle between the two sheets, the voltage U2 between the terminals of the second antenna (inside the second sheet) is related to the voltage U1 between the terminals of the first antenna (inside the first sheet) by the equation $$U2=U1(1-\theta/90°).$$

This amounts to assuming that the ratio of the voltages is substantially equal to the ratio of the facing areas of the second antenna and the antenna 100.

Considering now the configuration of the second sheet indicated by the reference 12C, and assuming that the antenna 100 of the read station is sufficiently large, it can be concluded that the voltage at the terminals of the antenna integrated into the second sheet is again at a maximum, i.e. that it is again equal to U1, with an evolution as a function of the angle between 90° and 180° that can be defined by $$U2=U1(\theta/90°-1).$$

Figure 2:
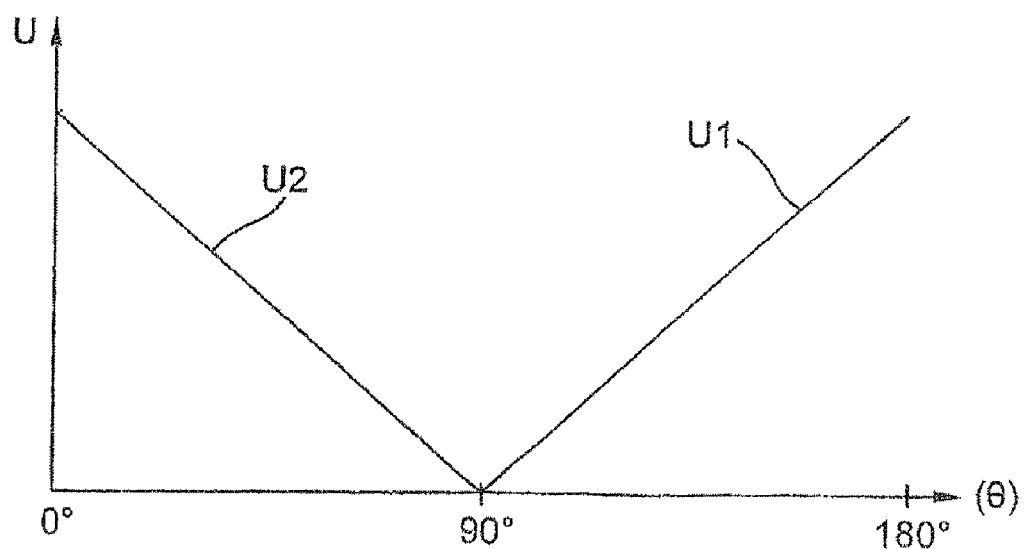
FIG. 2 is a graph showing the evolution of the voltage at the terminals of the antenna integrated into the second sheet as a function of the angle between the two sheets.

To a first approximation, there follows from this an evolution of the voltage at the terminals of the second antenna, as a function of the opening angle, that is represented in FIG. 2.

In reality, the evolutions between 0° and 90° and between 90° and 180° are not exactly linear, and the coupling between the antenna integrated into the first sheet and the antenna 100 is not completely independent of the angle of opening of the document: it increases slightly as the antenna of the second sheet moves away.

It is clear that it is possible to detect, by measuring the voltages between the terminals of the two antennas integrated into the sheets of the document, the geometrical configuration of those two sheets, in particular their angular offset.

Thus a simple binary comparison between the voltages U1 and U2 detects if the sheets are superposed (i.e. that the document is closed) or not: if the sheets are superposed, then the two voltages are equal, and the existence of a difference between the two voltages leads to the conclusion that the document is open.

In fact, this kind of binary comparison cannot distinguish situations in which the angle of the sheets is equal to 0° and equal to 180°. However, it should be noted that the binding of security documents generally does not allow two sheets to be exactly aligned in the open configuration, with the result that an opening angle of 180° is not realistic.

This kind of binary comparison can be obtained by means of a simple logic gate or an operational amplifier, as will be entirely evident to the person skilled in the art.

In practice, it would appear more realistic not to choose as the criterion the equality of the voltages between the terminals of the antennas integrated into the two sheets. In fact, as it has been stated above that the stiffness of the security document may prevent the two sheets from being aligned with each other, it may be considered unreliable to allow an exchange of information as soon as the sheets are at any non-null angle. For example, it would appear necessary not to allow reading of the data from the document if the sheets have a small relative angle, caused in particular by the presence of an airline ticket between the sheets of the passport, or some other document.

This is why it may be preferable for the test to entail a threshold value distinct from unity (therefore implying that the ratio of the voltages is other than 1).

Figure 3:
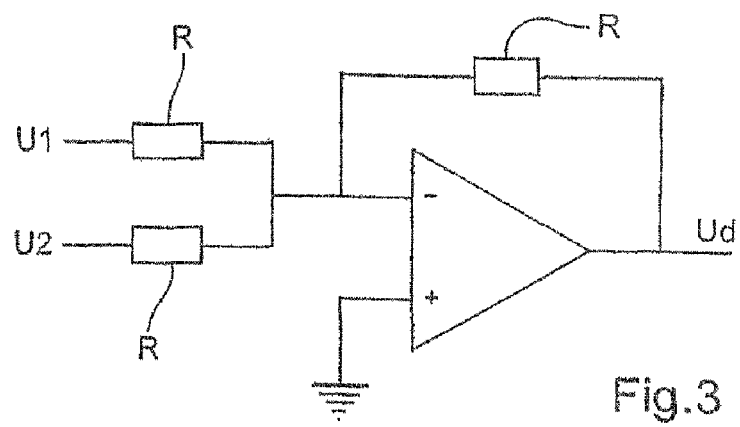
FIG. 3 is a diagram of a stage for comparison of the voltages emitted by the antennas.

FIG. 3 represents a simplified diagram of this kind of comparison stage, proceeding to a subtraction of the two voltages. The two voltages are applied to equal resistors and their sum is applied to the negative input of an operational amplifier the other input (the positive input) of which is connected to ground; a resistor with the same characteristics as the previous one is connected between the negative input of the operational amplifier and its output.

The output voltage can be written Vd=K (U1−U2), where K is a parameter defined by the configuration of the circuit concerned.

Given the above hypotheses, if the aim is to detect the opening angle passing through the 45° threshold, which approximately corresponds to a voltage U2 substantially equal to half the voltage U1, it follows that the threshold to be monitored to detect the document opening beyond 45° is the particular value of Vd that is equal to (K·U1)/2.

Figure 4:
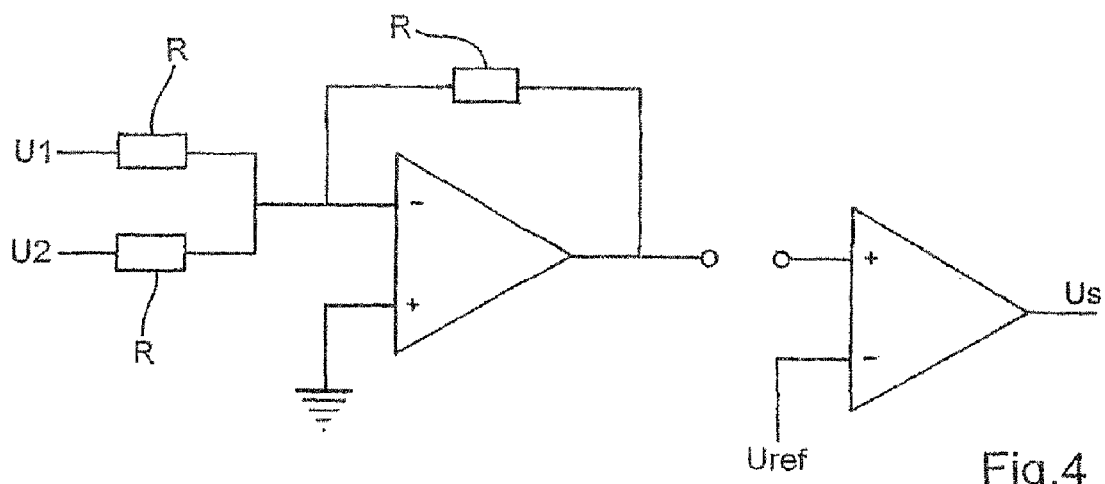
FIG. 4 is a diagram of a threshold detection stage including a stage conforming to FIG. 3.

This threshold can be detected by the FIG. 4 circuit, which adds to the FIG. 3 circuit a comparator stage such as that referred to hereinabove in relation to the "binary" comparison: to be more precise, the output of the FIG. 3 circuit is connected to the positive input of an operational amplifier the negative input of which is at the reference voltage Vref= (K·U1)/2. According to whether it is detected that the output Us, i.e. the difference between Ud and this reference voltage, is positive or negative, it is deduced that the angle is less than or greater than 45° (and less than 135°).

It is important to note that the existence of this test, according to the invention, enables the integrated circuit to trigger the procedure for exchange with the external environment or not. It can be stated that if the test is satisfied, the exchange procedure is triggered and can in practice continue to the end, as long as the data support remains in the field of the read station, even if the geometrical condition ceases to be complied with.

It goes without saying that this test is advantageously verified by the integrated circuit itself, even if, in an alternative embodiment, for greater security, there may be provision for the test to be verified by a dedicated circuit.

Figure 5:
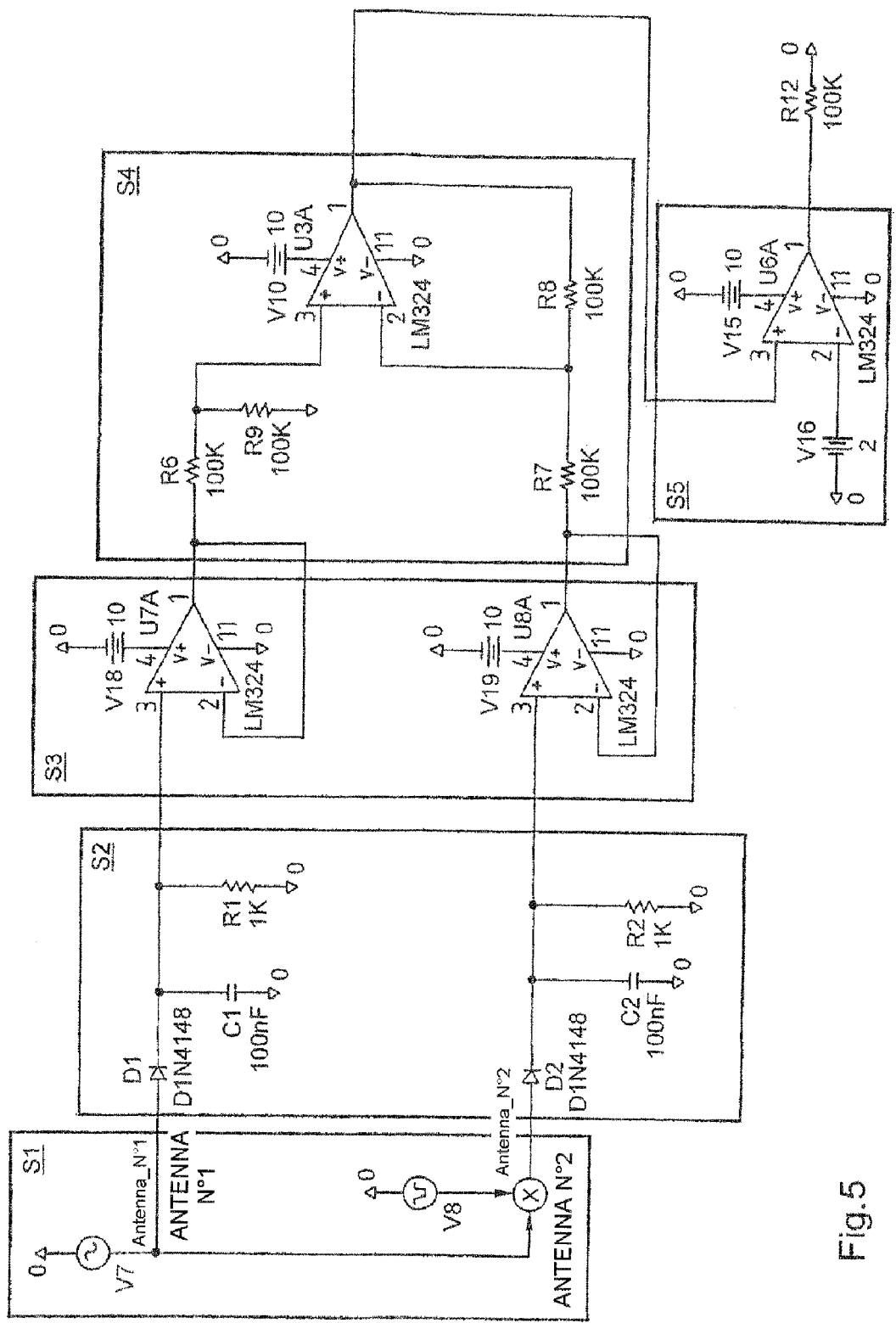
FIG. 5 is a detailed diagram of this kind of threshold detection stage.

FIG. 5 is a complete diagram of an input stage added, in accordance with the invention, to the integrated circuit of a security document, with:

a sub-stage S1 including the two antennas, and the outputs of which are the reactions of those antennas to the signal from the read station, a sub-stage S2 for shaping the antenna signals, with appropriate diodes, capacitors and resistors, an impedance matching sub-stage S3, with operational amplifiers the outputs of which are connected to the negative inputs, a subtractor sub-stage S4 (analogous to the FIG. 3 circuit), and a test sub-stage S5 the output of which serves as a switch for authorizing the integrated circuit to react to the signal from the read station or not.

As indicated above, the subtractor sub-stage quantifies the opening angle of the security document concerned (such as a passport) and the test sub-stage switches the integrated circuit to an operational state for exchanging data.

Figure 6:
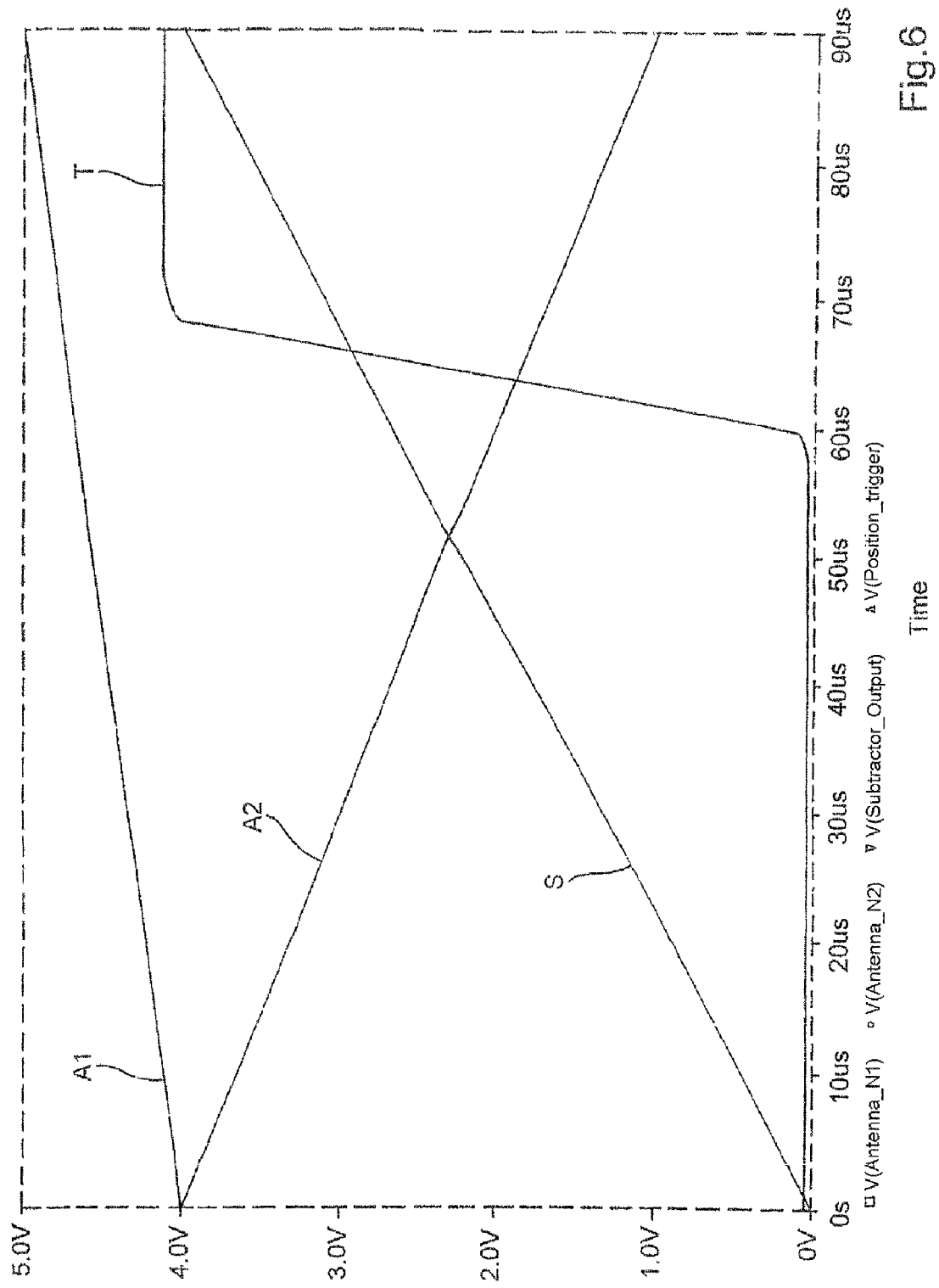
FIG. 6 is a graph showing the evolution over time of various parameters when one of the sheets is pivoted relative to the other by an angle from 0° to 90°.

FIG. 6 represents the variation over time (at the rate of 10 microseconds—denoted us in this figure—per 10°) of the signals A1 and A2, S and T emitted by the antennas, the subtractor and the test and switching sub-stage on opening the security document from 0° to 90°: note that the signal from the first antenna increases as mentioned above, that the signal A1 from the second antenna A2 has a minimum voltage that is not zero volts, and that the switching signal T here ceases to be zero from about 60 μs, i.e. from an opening angle of 60°.

Figure 7:
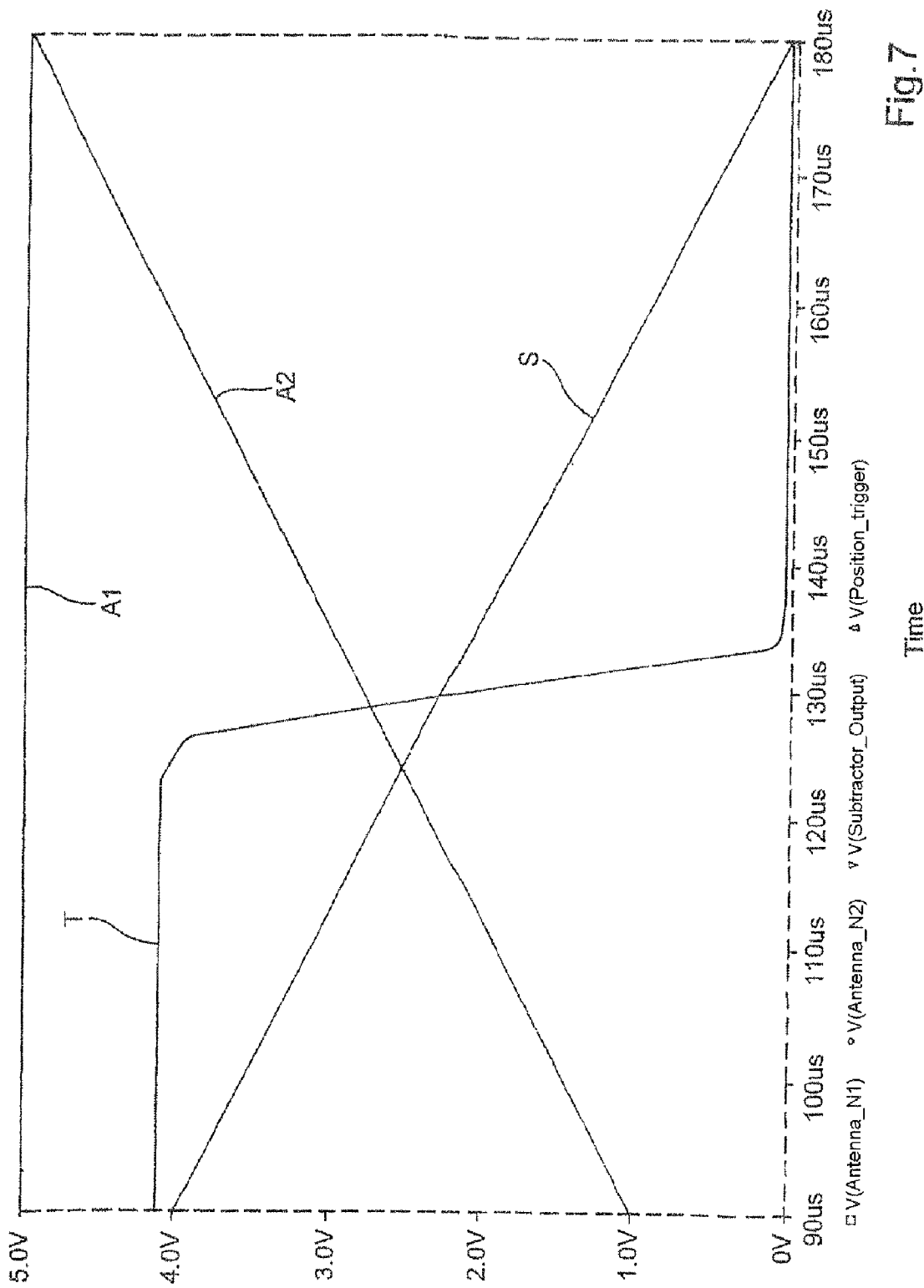
FIG. 7 is a graph analogous to that of FIG. 6 representing said parameters when said angle varies from 90° to 180°.

FIG. 7 represents the variation over time (again at the rate of 10 microseconds per 10°) of the signals during further opening of the document from 90° to 180°: note that the slope of the output signal S of the subtractor stage, positive during opening from 0° to 90°, becomes negative during closing, so that it is possible to detect with certainty the status of the document (the value of the subtraction signal gives the instantaneous angle while the slope gives the direction of variation (opening or closing)).

Clearly, although the foregoing explanation has been given in the context of precise hypotheses, it will be evident to the person skilled in the art how to generalize the above teachings to more complex situations.

For example, if the antennas are not of identical area, the foregoing reasoning applies subject to taking account of the ratio of the areas of the antennas (since in practice it is acceptable to assume that the voltages are proportional to the areas of the turns).

Moreover, if it is no longer assumed that the first sheet (the orientation of which remains fixed) is parallel to the antenna of the read station, it is clear that the variations of the voltage of the second antenna are of the same kind, even if that second voltage is no longer lower than that of the first antenna.

It will be evident to the person skilled in the art how to adapt the foregoing teachings accordingly, and to choose an appropriate threshold for the angular offset.

It will obviously be advantageous for all the read stations to have at least some common characteristics (orientation of the read antenna relative to the set point orientation of the first sheet, distance between that antenna and the set point position of the first sheet, size of the read antenna, etc.) which will facilitate the implementation of the aforementioned test in a security document.

Moreover, if it is assumed that the document is not necessarily placed in a given configuration to read it without contact (most importantly for unauthorized reading), it is seen that the voltages are substantially similar in the closed configuration.

It has just been indicated that, once the aforementioned test has been validated, the integrated circuit is authorized to dialog with the read station; it is up to the person skilled in the art to decide if that dialog is effected as a function of the signal from one of the antennas or both of them.

Moreover, there are many ways to detect, from the signals from the antennas in reaction to an external signal, the angular configuration of the two sheets that include the antennas. The correlation of the voltages at the terminals and that angular configuration have just been described.

Another way to detect the angular configuration of the two sheets, and to be able to authorize (or prohibit) a procedure of exchange between the integrated circuit and the external environment, is based on the phase of the signals.

In fact, it can be verified that the signals emitted by the two antennas have different phases relative to the signal from the read station.

In fact this phase difference varies in proportion to the frequency and the distance between the antenna of the read station and that concerned in the security document, and inversely proportional to the speed of light. However, it can be shown that the difference between these relative phases varies in proportion to the angle between the sheets, if the phase of one of the sheets (for example that of the first sheet that in theory remains in constant position and orientation) is taken as equal to zero.

In fact, it is known that the portion of the phase difference between the signal from the antenna of the read station and that from the first antenna that is caused by the distance between the antennas, which justifies considering that the phase of the signal from the first antenna is a null phase.

By calculating the product of the signals emitted by the antennas, a signal is obtained which, after passing through a low-frequency filter, has a phase equal to the difference between the phases of the respective signals from the antennas. As it has just been shown that it can be assumed that the phase of the signal from the first antenna has the value zero, it is deduced from this that the phase of the signal from the second antenna corresponds to the effect of the angle between these two antennas, and therefore between the two sheets. The amplitude of that signal therefore varies with the cosine of the angle between the two sheets.

Figure 8:
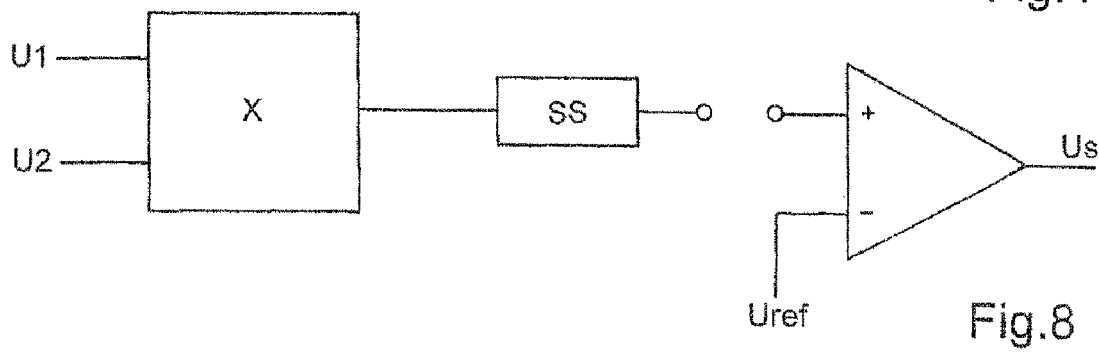
FIG. 8 is a diagram of a test stage employing multiplication of the signals emitted by the antennas.

Thus a procedure can be adopted analogous to that explained in connection with the voltages at the terminals. To be more precise, the FIG. 8 circuit can be used, which features a multiplication stage X formed of a multiplier, to the input of which are applied the two antenna signals U1 and U2, and a low-frequency filter SS to which the output of the multiplier is applied and the output of which is filtered. This filtered output is then applied to a comparator formed of an operational amplifier whose positive input receives the filtered signal and whose negative input receives a set point value defined as a function of the cosine of the angle that is taken as the threshold. According to whether the output of this comparator is positive or negative, it is deduced that the angle between the two sheets is below or above the fixed threshold and a substantially binary signal Us is emitted accordingly, enabling exchange of information between the integrated circuit and the external environment via one of the antennas (or both), at the choice of the designer) to be triggered or prohibited.

Figure 9:
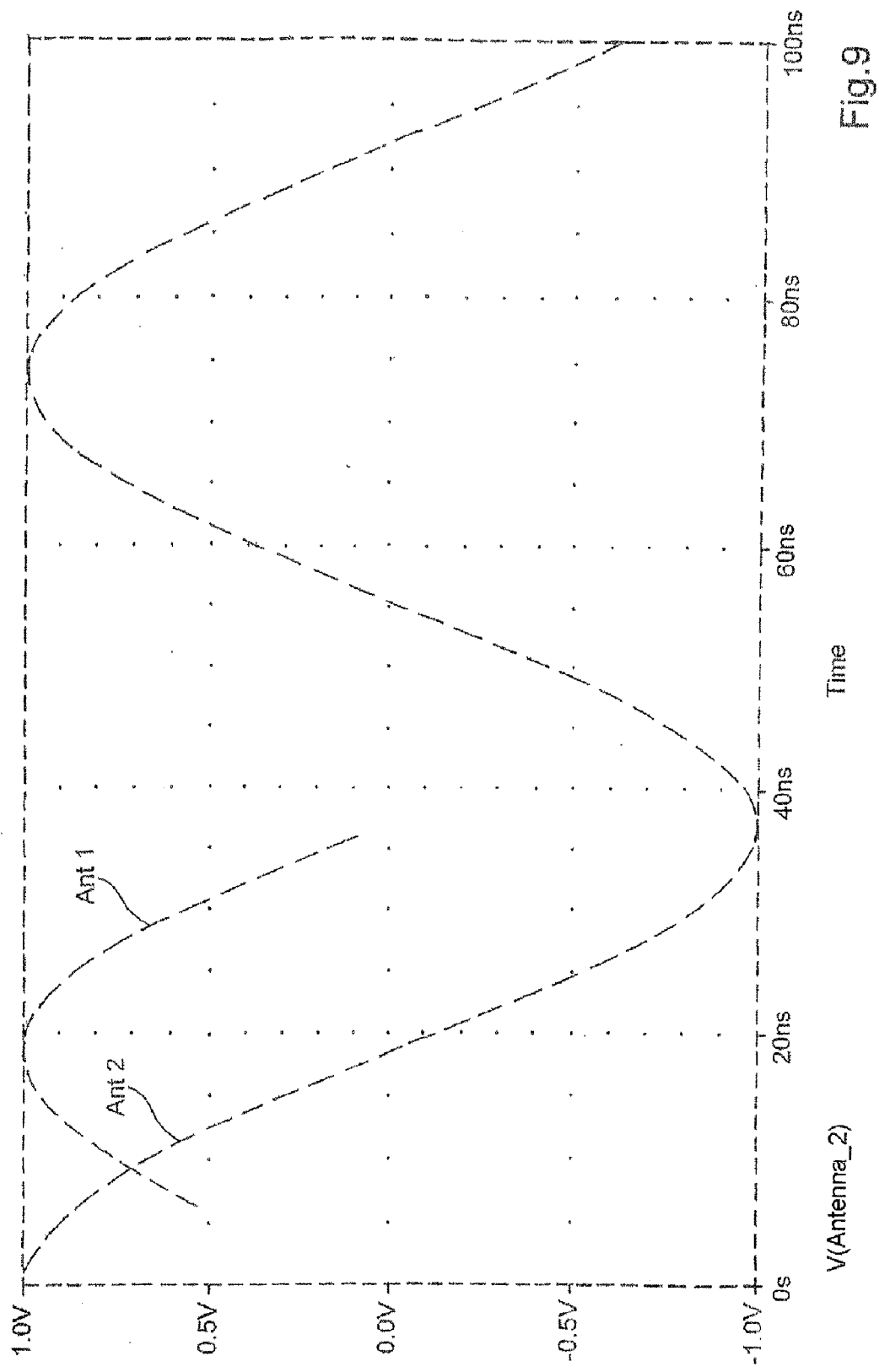
FIG. 9 is a graph showing the phase difference between the signals emitted by the two antennas.

Alternatively, the phase of the second antenna (which moves relative to the first antenna assumed to be substantially fixed) can be measured at several times starting from a starting configuration in which that antenna is superposed on the first antenna. When a phase variation is detected above a predetermined threshold, it can be deduced that the opening angle of the document has reached the predetermined threshold. Thus FIG. 9 shows the curve corresponding to the first antenna (and to the second antenna in the closed configuration) and the curve corresponding to this second antenna when it reaches 90°: any intermediate value can be chosen as the threshold for authorizing the integrated circuit to exchange information with the external environment. The accuracy of threshold detection depends of course on the positional stability and above all the orientation of the first sheet during these successive measurements.

A multiplexer can be used to which the signals emitted by the antennas are applied. It can be shown that the maximum amplitude, or the average amplitude, of the signal obtained at the output varies in a linear manner with the phase difference between the two signals. It is therefore possible to characterize the phase difference between the two antennas by the instantaneous level of the maximum amplitude or the average amplitude.

A further alternative is to apply the signals emitted by the antennas to a subtractor, to measure the component of the output signal that depends on the phase difference and to track the crossing of a predetermined threshold.

For improved performance, detection of the voltage difference (or power difference) between the antennas can be associated with detection of the phase difference between the signals emitted by the antennas. This association increases the efficacy of detection and increases the reliability of the conclusions as to triggering or prohibiting exchanges between the integrated circuit and the external environment by means of one or both antennas.

Figure 10:
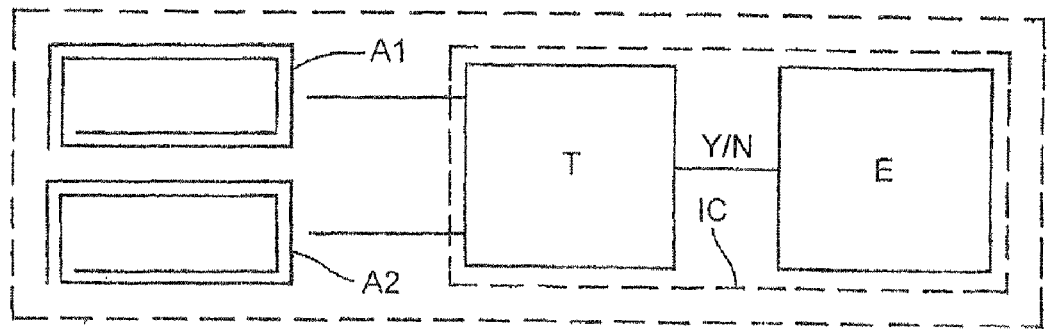
FIG. 10 is a diagram of the principle of a document according to the invention and its operation.

In all cases, as shown in FIG. 10, there is therefore a test stage T for checking, on the basis of the signals emitted by the antennas A1 and A2, a condition as to the angular offset between the two sheets each carrying one of the antennas, and generating a binary output signal Y/N (authorization or prohibition) the state of which authorizes or prohibits activation of an exchange stage E of the integrated circuit IC so as to dialog with the environment via one or both antennas. The test stage is shown as forming part of the integrated circuit, but it must be understood that this stage can alternatively be an independent circuit.

In a particularly simplified version of the invention, there is only one antenna produced partly on the first sheet and partly on the second sheet. Depending on the relative angular configuration of these sheets, the area facing the antenna of the read station is larger or smaller, and the authorization given to the integrated circuit to dialog with the environment can be subject to detection of the signal emitted by the antenna reaching and exceeding a predetermined voltage (or current or power) threshold.

The invention claimed is:

1. Foldable data support, including a support with at least first and second sheets (11, 12A, 12B, 12C) configured to pivot relative to each other with respect to a line (P) along the edges of said sheets and a contactless chip mounted in said support and including an electronic circuit (IC) and coupling elements (A1, A2) connected to said electronic circuit distributed between the first and second sheets and configured to be electromagnetically coupled to an external reading station, this electronic circuit including an exchange portion configured to exchange information at least with the external reading station, characterized in that said support carries a test device configured to verify by means of signals emitted by the coupling elements a geometrical condition on the angular configuration on the first and second sheets and to generate as a function of the result of said test a signal authorizing or prohibiting activation of the exchange portion of the electronic circuit.

2. Support according to claim 1, characterized in that the geometrical condition on the angular configuration of the sheets entails comparison of the instantaneous angular offset between the first and second sheets to at least one threshold value.

3. Support according to claim 1, characterized in that the coupling elements include first and second antennas connected in parallel to inputs of the test device and carried by the first and second sheets, respectively.

4. Support according to claim 3, characterized in that the test device is designed to detect the voltage between the terminals of each of the first and second antennas and to authorize activation of the exchange portion of the electronic circuit if the difference between the voltages between the terminals of the antennas reaches a predetermined threshold corresponding to a predetermined angular threshold.

5. Support according to claim 3, characterized in that the test device is designed to detect the phase of each signal emitted by the first and second antennas and to authorize activation of the exchange portion of the electronic circuit if the difference between the phases of those signals reaches a predetermined threshold corresponding to a predetermined angular threshold.

6. Support according to claim 3, characterized in that the test device is designed to detect the voltage between the terminals of each of the first and second antennas, to detect the phase of each of the signals emitted by those antennas and to authorize activation of the exchange portion of the electronic circuit if the difference between the voltages between the terminals of the antennas reaches a first predetermined threshold and if the difference between the phases of those signals reaches a second predetermined threshold, these first and second predetermined thresholds corresponding to a predetermined angular threshold.

7. Support according to claim 4, characterized in that the test device is designed to determine the difference between the voltages between the terminals of the first and second antennas by subtraction of the signals emitted by those antennas.

8. Support according to claim 5, characterized in that the test device is designed to determine the difference between the phases between the signals emitted by the antennas by multiplication of those signals.

9. Support according to claim 8, characterized in that the test device includes a low-frequency filter device after a multiplication stage.

10. Support according to claim 3, characterized in that the antennas are of the same geometry to generate identical signals when the two sheets are superposed.

11. Support according to claim 3, characterized in that the antennas are situated on the respective sheets so as to be superposed when the sheets that carry them are superposed.

12. Support according to claim 1, characterized in that the sheets form part of a passport.

13. Support according to claim 2, characterized in that the coupling elements include first and second antennas connected in parallel to inputs of the test device and carried by the first and second sheets, respectively.

14. Support according to claim 6, characterized in that the test device is designed to determine the difference between the voltages between the terminals of the first and second antennas by subtraction of the signals emitted by those antennas.

15. Support according to claim 6, characterized in that the test device is designed to determine the difference between the phases between the signals emitted by the antennas by multiplication of those signals.

16. Method of controlling exchange of information between a foldable data support and an external reading station, the foldable data support including a support having at least first and second sheets (11, 12A, 12B, 12C) configured to pivot relative to each other with respect to a line (P) along the edges of these sheets, and a contactless chip mounted in this support and including an electronic circuit (IC) and coupling elements (A1, A2) connected to this electronic circuit, distributed between the first and second sheets and configured to be electromagnetically coupled to an external reading station, this electronic circuit including an exchange portion configured to exchange information at least with the external reading station, the method comprising the steps of:

carrying out a test to verify, by means of signals emitted by the coupling elements, a geometrical condition on the angular configuration of the first and second sheets; and
generating, as a function of the result of that test, a signal authorizing or prohibiting activation of the exchange portion of the electronic circuit.

* * * * *